(12) United States Patent
Ozbag

(10) Patent No.: US 11,890,648 B2
(45) Date of Patent: Feb. 6, 2024

(54) PRE-CLEANING SYSTEM FOR PROVIDING PURIFICATION OF HAZELNUT FROM FOREIGN SUBSTANCES

(71) Applicant: BALSU GIDA SANAYI VE TICARET ANONIM SIRKETI, Sakarya (AR)

(72) Inventor: Nusret Ozbag, Sakarya (AR)

(73) Assignee: BALSU GIDA SANAYI VE TICARET ANONIM SIRKETI, Sakarya (TR)

( * ) Notice: Subject to any disclaimer, the term of this patent is extended or adjusted under 35 U.S.C. 154(b) by 0 days.

(21) Appl. No.: 18/245,908

(22) PCT Filed: Jan. 19, 2022

(86) PCT No.: PCT/TR2022/050042
§ 371 (c)(1),
(2) Date: Mar. 20, 2023

(87) PCT Pub. No.: WO2022/250628
PCT Pub. Date: Dec. 1, 2022

(65) Prior Publication Data
US 2023/0381820 A1    Nov. 30, 2023

(30) Foreign Application Priority Data

May 26, 2021    (TR) ............................... 2021/008702

(51) Int. Cl.
*B07B 9/00* (2006.01)
*B07B 4/02* (2006.01)
*A23N 12/00* (2006.01)

(52) U.S. Cl.
CPC ................ *B07B 9/00* (2013.01); *A23N 12/00* (2013.01); *B07B 4/02* (2013.01); *B07B 2201/04* (2013.01)

(58) Field of Classification Search
CPC ......... B07B 2201/04; B07B 4/02; B07B 9/00; A23N 12/00
(Continued)

(56) References Cited

FOREIGN PATENT DOCUMENTS

| CN | 204799559 U |   | 11/2015 |   |
|---|---|---|---|---|
| CN | 106378303 A | * | 2/2017 | ............... A23B 9/08 |

(Continued)

*Primary Examiner* — Terrell H Matthews
(74) *Attorney, Agent, or Firm* — Bayramoglu Law Offices LLC

(57) ABSTRACT

A pre-cleaning system is provided. The pre-cleaning system is for providing purification of unshelled hazelnut at least partially from foreign substances before processing of unshelled hazelnut. The improvement of the pre-cleaning system is that the pre-cleaning system includes at least one first separation unit where the foreign substances, which are outside the acceptable dimensions of unshelled hazelnut, are sieved and separated, at least one second separation unit positioned in the vicinity of said first separation unit and which can provide separation of foreign substances, which have specific weight lower than the specific weight of acceptable unshelled hazelnut, by means of an artificial air flow provided in at least one flow path provided thereon, at least one third separation unit positioned in the vicinity of said second separation unit and which can provide separation of foreign substances, which have specific weight higher than the specific weight of unshelled hazelnut.

7 Claims, 3 Drawing Sheets

(58) Field of Classification Search
USPC .................................................. 209/12.1, 36
See application file for complete search history.

(56) References Cited

FOREIGN PATENT DOCUMENTS

| | | | | |
|---|---|---|---|---|
| CN | 106378303 A | | 2/2017 | |
| CN | 108499868 A | * | 9/2018 | |
| CN | 108499868 A | | 9/2018 | |
| CN | 109647712 A | * | 4/2019 | ............... B07B 1/04 |
| CN | 209968881 U | | 1/2020 | |
| CN | 112108370 A | | 12/2020 | |
| KR | 100876542 B1 | * | 12/2007 | |
| RU | 2480284 C1 | | 4/2013 | |
| TR | 201915184 A2 | * | 11/2019 | |

* cited by examiner

PRE-CLEANING SYSTEM FOR PROVIDING PURIFICATION OF HAZELNUT FROM FOREIGN SUBSTANCES

CROSS REFERENCE TO THE RELATED APPLICATIONS

This application is the national phase entry of International Application No. PCT/TR2022/050042, filed on Jan. 19, 2022, which is based upon and claims priority to Turkish Patent Application No. 2021/008702, filed on May 26, 2021, the entire contents of which are incorporated herein by reference.

TECHNICAL FIELD

The present invention relates to at least one pre-cleaning system for providing purification of unshelled hazelnut at least partially from foreign substances before processing of unshelled hazelnut.

BACKGROUND

Hazelnut processing plants include process steps until turning unshelled hazelnut into decorticated hazelnut. These process steps can include breaking, cleaning and packaging of hazelnut. Hazelnut is presented to market after being subjected to breaking and cleaning processes in hazelnut processing plants. Thus, plants, which exist at close distance where hazelnut breaking and cleaning processes can be realized, are an important need for the hazelnut producer for presenting the product to the market without devaluation of the product.

In the acceptance and storage process steps for unshelled hazelnut, there can be potential foreign substances and cheats which can be together with the product because hazelnut is an agricultural-sourced product. Among the reasons of this can be filling hazelnut into big bags, carrying branches together with the hazelnut, mixing soil to the batch due to falling on the soil, mixing of broken parts, stones, garbage, dust and hollow grains and mixing of cheap foreign substances like hollow shell together with unshelled hazelnut. Besides these, even though the unshelled hazelnut, brought to the processing plant, is clean, it can be hollow or creased. The presence of such items in the hazelnut processing plants decreases efficient operation of the plant. Against these, the need for pre-cleaning of hazelnut in the art increases.

The application with number CN108499868A known in the literature relates to a sieving system. The invention provides purification, classification and sieving processes for unshelled nuts. In the product, product input is realized by means of a spiral. This invention shows similarity to our subject matter because in this invention the materials except hazelnut are thrown by means of air with the help of negative pressured air. Afterwards, the hazelnut grains, which pass to the lower part, complete the classification process according to their dimensions with the help of vibrated inclined sieves.

The application with number CN106378303A known in the literature relates to a cleaner. The invention realizes multiple pre-cleaning processes and applies wheat cleaning process. In the wheat cleaning process, firstly, wheat passes through the sieve, and impurities larger than the wheat are separated. Afterwards, wheat passes through another sieve, and separation from the sand and dust particles which are smaller than wheat is realized. Because of the process of separation of external materials from the product by using sieve, this invention is similar to our research subject. Afterwards, thanks to air flow, the materials except wheat which are denser than wheat are separated on the floor.

The application with number RU2480284C1 known in the literature relates to processing line. The invention provides corn seed to become ready for corn oil production. Corn grains pass through the sieve and dimensional irregularities are prevented. Afterwards, process is applied for separating stones. In the invention, photoelectric separators are used for realizing separation according to color.

These embodiments known in the art are related to pre-cleaning of various food items. However, these studies do not bring a satisfactory solution for pre-cleaning of hazelnut. In the same manner, these studies have no contribution for elimination of the faults in the hazelnut processing procedures which are known in the art.

As a result, because of the abovementioned problems, an improvement is required in the related technical field.

SUMMARY

The present invention relates to a pre-cleaning system, for eliminating the abovementioned disadvantages and for bringing new advantages to the related technical field.

An object of the present invention is to provide a pre-cleaning system for providing purification of unshelled hazelnut from foreign substances before processing of unshelled hazelnut.

Another object of the present invention is to provide a pre-cleaning system which provides separation of dust which exists on the unshelled hazelnut.

Another object of the present invention is to provide a pre-cleaning system which provides separation of the grains which have small amount of decorticated hazelnut which exist in the unshelled hazelnut.

Another object of the present invention is to provide a pre-cleaning system which provides separation of substances like stone, soil which have different specific weight and which exist in the unshelled hazelnut.

In order to realize the abovementioned objects and the objects which are to be deducted from the detailed description below, the present invention is at least one pre-cleaning system for providing purification of unshelled hazelnut at least partially from foreign substances before processing of unshelled hazelnut. Accordingly, the improvement is that the subject matter pre-cleaning system includes at least one first separation unit where the foreign substances, which are outside the acceptable dimensions of unshelled hazelnut, are sieved and separated, at least one second separation unit positioned in the vicinity of said first separation unit and which can provide separation of foreign substances, which have specific weight lower than the specific weight of acceptable unshelled hazelnut, by means of an artificial air flow provided in at least one flow path provided thereon, at least one third separation unit positioned in the vicinity of said second separation unit and which can provide separation of foreign substances, which have specific weight higher than the specific weight of unshelled hazelnut, by means of artificial air flow and convection. Thus, the pre-cleaning system purifies unshelled hazelnut from foreign substances before processing of unshelled hazelnut.

In a possible embodiment of the present invention, at least one lower sieve and at least one upper sieve, which enable sieving of unshelled hazelnut which has diameter between acceptable diameters, are provided at said first separation unit Thus, the foreign substances, which have diameters which are outside of the two predetermined diameter values of the unshelled hazelnut, are separated.

In another possible embodiment of the present invention, at least one first goods inlet, through which dirty unshelled hazelnut enters, is provided at one side of said lower sieve and said upper sieve, and at least one first goods outlet, through which the unshelled hazelnut purified from foreign substance is discharged, is provided at the other side of said lower sieve and said upper sieve.

In another possible embodiment of the present invention, said flow path in the second separation unit includes at least one first blowing part which forms air pressure from one side, and at least one first suction part which can realize air suction on the other side. Thus, the foreign substances, which have specific weight which is higher than the specific weight of unshelled hazelnut, are separated by means of the air flow provided in said flow path.

In another possible embodiment of the present invention, at least one second waste discharge part is provided for providing discharge of foreign substances at said first blowing part, and at least one second goods outlet part is provided which can enable discharge of cleaned unshelled hazelnut at said first suction part.

In another possible embodiment of the present invention, at least one wall is provided which at least partially displaces in the second separation unit and which can arrange the air flow speed in the flow path and which can arrange the separation process thanks to this. Thus, the speed of air flow is adjusted and the separation process is improved.

In another possible embodiment of the present invention, on said third separation unit; there is at least one inverse stepped sieve whereon the unshelled hazelnut is laid and positioned in an at least partially inclined form with respect to the floor, at least one second blowing part and at least one second suction part which can realize air flow for providing separation of unshelled hazelnut and foreign substances from each other on said inverse stepped sieve, and said inverse stepped sieve is at least partially movable in order to be able to carry foreign substances which exist on said inverse stepped sieve. Thus, by means of air flow provided in said flow path, separation of foreign substances, which have specific weight lower than the specific weight of unshelled hazelnut, is provided.

REFERENCE NUMBERS

Figure 1:
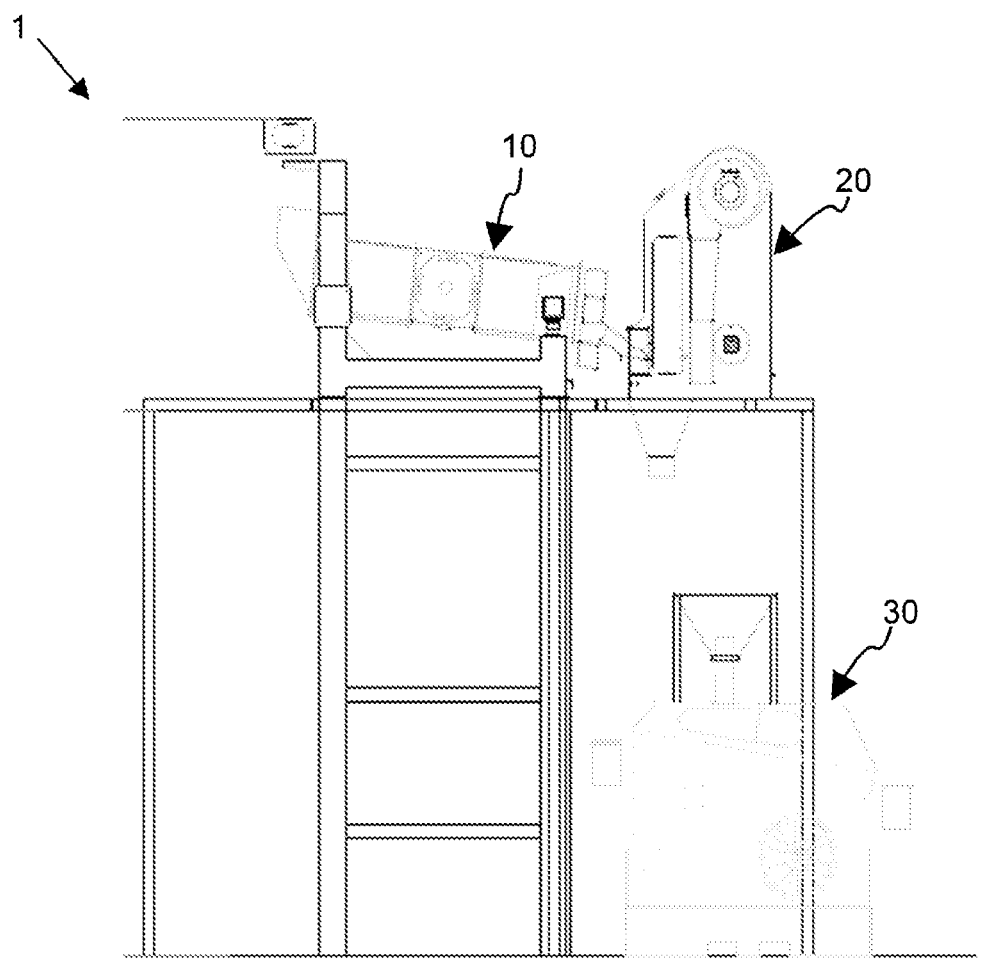
In FIG. 1, a representative lateral view of the subject matter pre-cleaning system is given.

1 Pre-cleaning system
10 First separation unit
11 Chamber
12 First goods inlet
13 First goods outlet
14 Upper sieve
15 Upper sieve waste discharge part
16 Lower sieve
17 Lower sieve waste discharge part
20 Second separation unit
21 Second goods inlet
22 Flow path
23 First blowing part
24 Second goods outlet
25 First suction part
26 Second waste discharge part
27 Wall
30 Third separation unit
31 Body
32 Inverse stepped sieve
33 Third goods inlet
34 Third goods outlet
35 Third waste discharge part
36 Second suction part
37 Second blowing part

DETAILED DESCRIPTION OF THE EMBODIMENTS

In this detailed description, the subject matter is explained with references to examples without forming any restrictive effect only in order to make the subject more understandable.

In FIG. 1, a representative lateral view of the subject matter pre-cleaning system (1) is given. Accordingly, said pre-cleaning system (1) is configured to provide separation of particularly unshelled hazelnut from foreign substances. This pre-cleaning system (1) can be used after goods receiving in hazelnut processing plants. The foreign substances mentioned in the invention can be items like dust, empty hazelnut, stone, soil, big bag yarn, etc. which exist in the unshelled hazelnut cluster by means of various ways. In order to provide separation of such foreign substances from unshelled hazelnut, there is at least one first separation unit (10), at least one second separation unit (20) and at least one third separation unit (30) in the pre-cleaning system (1). As these separation units operate in a synchronized manner, the unshelled hazelnut is purified from foreign items.

Figure 2:
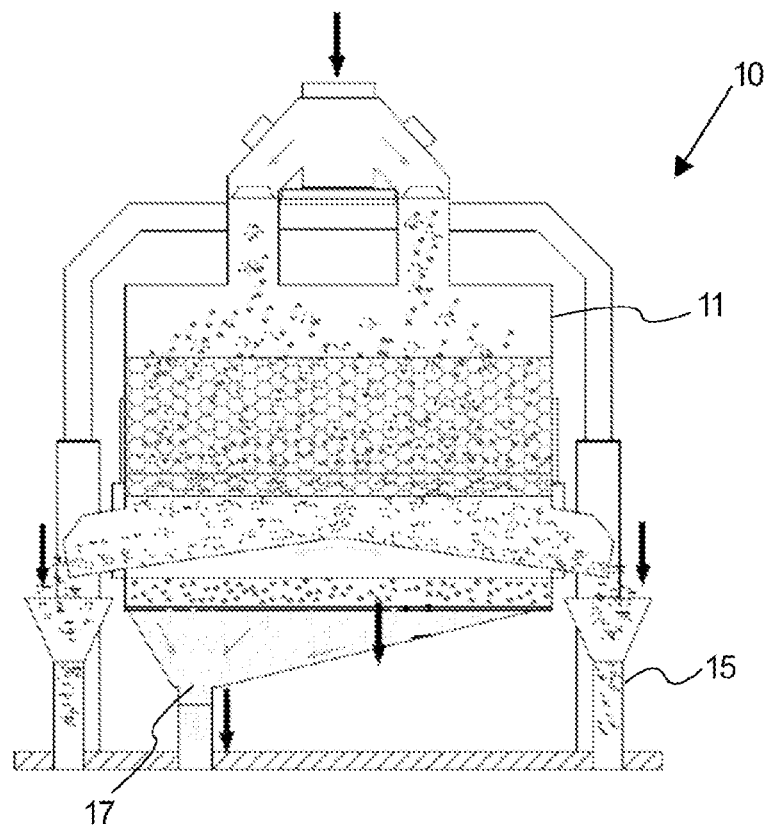
In FIG. 2, a representative frontal view of the first separation unit, provided in the subject matter pre-cleaning system, is given.
Figure 3:
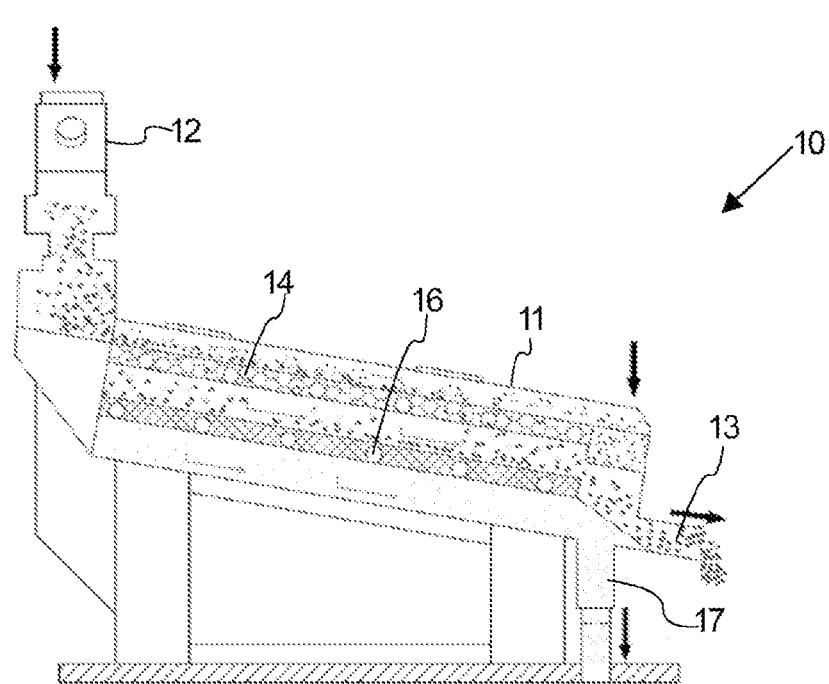
In FIG. 3, a representative lateral view of the first separation unit, provided in the subject matter pre-cleaning system, is given.

In FIGS. 2 and 3, the representative frontal and lateral views of the first separation unit (10), provided in the subject matter pre-cleaning system (1), is given. Accordingly, said first separation unit (10) provides sieving and separating of foreign substances except acceptable dimensions of unshelled hazelnut. In order to be able realize this, the first separation unit (10) has at least one chamber (11) and a first goods inlet (12) and a first goods outlet (13) provided at mutual sides of said chamber (11). While unshelled hazelnut, having foreign substances therein, enter said first goods inlet (12), unshelled hazelnut, where dust existing therein is removed, exits said first goods outlet (13). This process is provided by means of at least one lower sieve (16) and at least one upper sieve (14) existing inside the chamber (11). Said lower sieve (16) and said upper sieve (14) are positioned one above the other in a parallel manner to each other inside the chamber (11). The sieving gap of the upper sieve (14) is wider than the sieving gap of the lower sieve (16). While the upper sieve (14) preferably has a passage gap of 25 mm, the lower sieve (16) has a passage gap of 5 mm. Thanks to this, while big-dimensioned items like big bag yarn, straw, garbage, coarse particles, tree branch are held on the upper sieve (14), the items like small-dimensioned tiny parts, broken product, duct, soil are separated at the lower sieve (16). The items, which remain between the lower sieve (16) and the upper sieve (14), are unshelled hazelnuts purified from foreign substances at least partially. The chamber (11) is positioned in an at least partially inclined form in order for the unshelled hazelnut to be advanced from the first goods inlet (12) towards the second goods inlet (21). Thanks to this, the unshelled hazelnut is advanced from one location to another location simply by means of the effect of gravity. Additionally, in a possible embodiment, the first separation unit (10) can be configured to be able to vibrate. Thanks to this, the unshelled hazelnut is distributed on the upper sieve (14) in a wider manner and is sieved in a more efficient manner. While the sieved items are advanced to the next step from the first goods outlet (13), the wastes, which exist at the upper sieve (14), are discharged through at least one upper sieve waste discharge part (15), and the wastes, which fall under the lower sieve (16), are discharged through at least one lower sieve waste discharge part (17).

Figure 4:
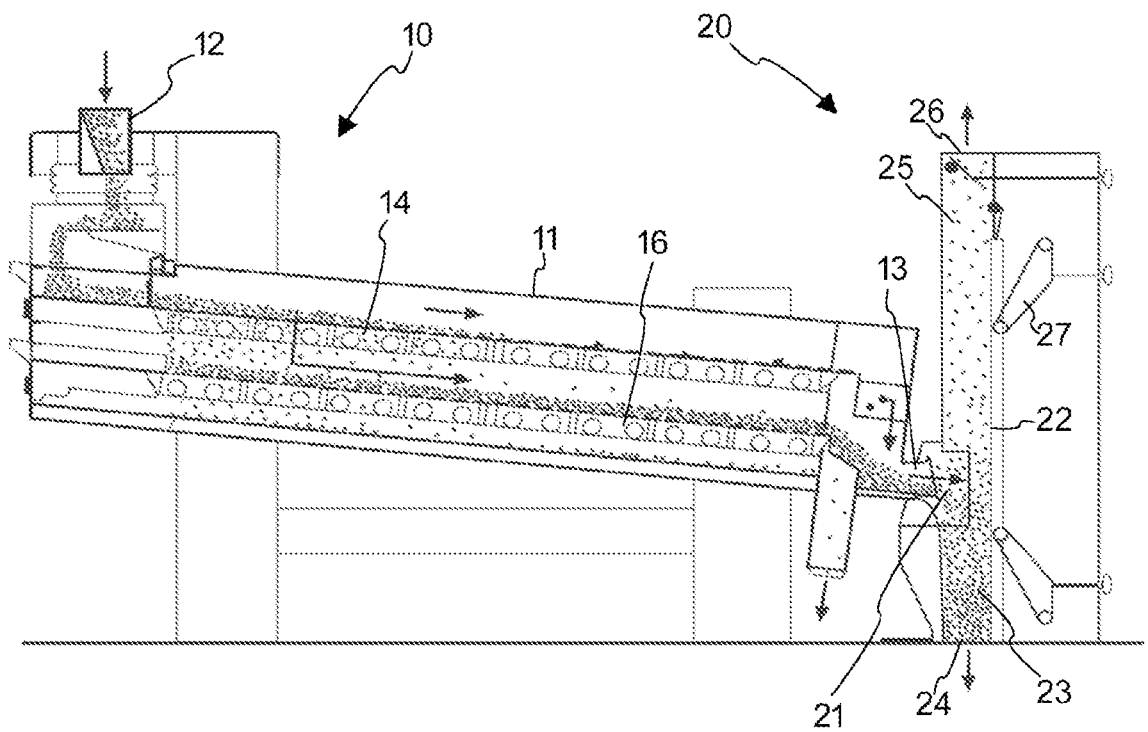
In FIG. 4, a representative lateral view of the second separation unit, provided in the subject matter pre-cleaning system, is given.

In FIG. 4, a representative lateral view of the second separation unit (20), provided in the subject matter pre-cleaning system (1), is given. Said second separation unit (20) provides separation of foreign substances (low density particles like dust, shell parts and hollow hazelnut), which has specific weight lower than the specific weight of acceptable unshelled hazelnut, by means of an artificial air flow provided in at least one flow path (22) provided thereon. The second separation unit (20) is positioned at the continuation of the first separation unit (10). There is at least one second goods inlet (21) and at least one second goods outlet (24) in the second separation unit (20). The second goods inlet (21) is essentially provided at the end of the first goods outlet (13). The unshelled hazelnut, discharged through the first goods outlet (13), enters the second separation unit (20) through the second goods inlet (21). There is at least one first blowing part (23) and at least one first suction part (25) on at least one flow path (22) at the second separation unit (20). Said first blowing part (23) is preferably positioned at the side which is towards the gravity. Said first suction part (25) corresponds to the first blowing part (23). A continuous air flow is formed from the first blowing part (23) towards the first suction part (25). While air is given from the first blowing part (23), this air is suctioned through the first suction part (25). By means of this, the unshelled hazelnut is separated according to the specific weight thereof. There is at least one wall (27) between the first suction part (25) and the first blowing part (23). This wall (27) accelerates and decelerates air flow and provides adjustment of the separation process in the best manner. Said second goods outlet (24) essentially exists at the first blowing part (23) in the second separation unit (20). Despite the blowing, the unshelled hazelnuts which cannot be advanced to the first suction part (25), in other words, the cleaned unshelled hazelnut is discharged through the second goods outlet (24). The foreign substances, advanced to the first suction part (25) by means of the air flow which exists on the flow path (22), are discharged through at least one second waste discharge part (26) which exists at the first suction part (25).

Figure 5:
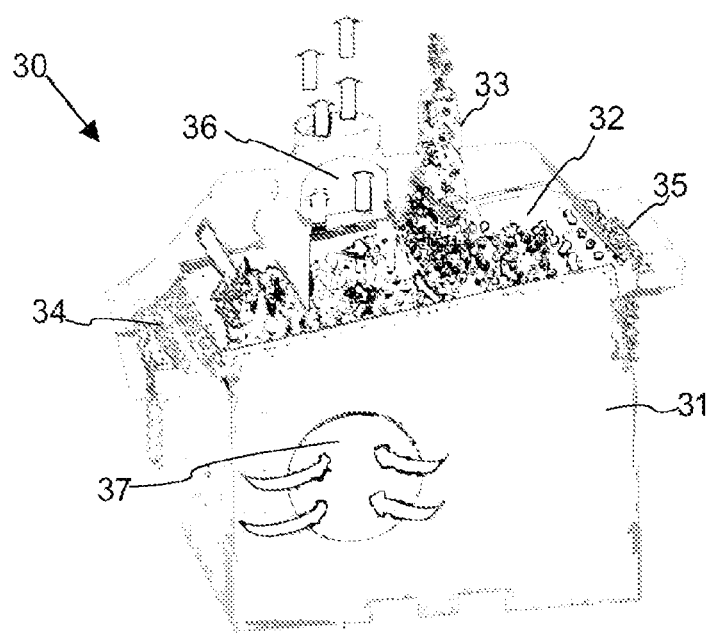
In FIG. 5, a representative perspective view of the third separation unit, provided in the subject matter pre-cleaning system, is given.

In FIG. 5, a representative perspective view of the third separation unit (30), provided in the subject matter pre-cleaning system (1), is given. Said third separation unit (30) provides separation of foreign substances, which have specific weight which is higher than the specific weight of the unshelled hazelnut, by means of artificial air flow and convection. This mentioned foreign substance can be an item like soil, stone, etc. In order to provide this, there is at least one body (31) on the third separation unit (30) and there is at least one inverse stepped sieve (32) on said body (31). Said inverse stepped sieve (32) is positioned on the body (31) in an at least partially inclined manner. There is at least one third goods inlet (33) in the upper vicinity of the inverse stepped sieve (32). Said third goods inlet (33) is essentially associated with the second goods outlet (24). The unshelled hazelnut taken from the second goods inlet (21) is advanced to the third separation unit (30) by means of the third goods inlet (33). The unshelled hazelnut is continuously poured onto the inverse stepped sieve (32) through the third goods inlet (33). In a possible embodiment of the present invention, the inverse stepped sieve (32) is configured to be vibrated. The inverse stepped sieve (32) is inclined. There is at least one third goods outlet (34) at the part of the inverse stepped sieve (32) which is low. At the high part of the inverse stepped sieve (32), there is at least one third waste discharge part (35). Said third goods outlet (34) is the part where the unshelled hazelnut is purified from items like stone, soil having specific weight difference with respect to the unshelled hazelnut. Said third waste discharge part (35) is the part where foreign substances are removed from unshelled hazelnut and discharged. There is at least one second blowing part (37) and at least one second suction parts (36) in the third separation unit (30). This structure shows similarity to the structure provided in the second separation unit (20). The second blowing part (37) realizes blowing, which is in inverse direction with respect to gravity, to the inverse stepped sieve (32) at least partially. As a result of this, the unshelled hazelnut is separated at least partially from the inverse stepped sieve (32). Air suction process is realized such that this force is also supported by the suction part. Thanks to this, only the foreign substances, which have higher specific weight, remain on the inverse stepped sieve (32). In this case, the inverse stepped sieve (32) is moved towards the third waste discharge part (35) and provides discharge of the foreign substances and at the same time, it provides discharge of the unshelled hazelnuts through the third goods outlet (34).

By means of all these embodiments, the heavy, light, empty grained, coarse and tiny garbage, which can exist in the unshelled hazelnut, are separated and discharged. In this case, the unshelled hazelnuts can be advanced to the next step of the hazelnut processing plant in a cleaned form. In this embodiment, by means of the first separation unit (10), the second separation unit (20) and the third separation unit (30), the unshelled hazelnut is automatically cleaned from waste substance in various manners and by means of this, the dependency on human force is reduced, and more number of unshelled hazelnut is cleaned in unit time.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A pre-cleaning system for providing a purification of an unshelled hazelnut at least partially from foreign substances before a processing of the unshelled hazelnut, wherein the pre-cleaning system comprises:
    at least one first separation unit where the foreign substances are sieved and separated, wherein the foreign substances are outside acceptable dimensions of the unshelled hazelnut,
    at least one second separation unit, wherein the at least one second separation unit is positioned in a vicinity of the at least one first separation unit and is configured to provide a separation of foreign substances by means of an artificial air flow provided in at least one flow path provided thereon, wherein the foreign substances have a specific weight lower than a specific weight of an acceptable unshelled hazelnut, at least one third separation unit, wherein the at least one third separation unit is positioned in a vicinity of the at least one second separation unit and is configured to provide a separation of foreign substances by means of the artificial air flow and convection, wherein the foreign substances have a specific weight higher than a specific weight of the unshelled hazelnut.

2. The pre-cleaning system according to claim 1, wherein at least one lower sieve and at least one upper sieve are provided at the at least one first separation unit, wherein the at least one lower sieve and the at least one upper sieve enable sieving of the unshelled hazelnut, and the unshelled hazelnut has a diameter between acceptable diameters.

3. The pre-cleaning system according to claim 2, wherein at least one first goods inlet is provided at a first side of the at least one lower sieve and the at least one upper sieve, wherein a dirty unshelled hazelnut enters through the at least one first goods inlet, and at least one first goods outlet is provided at a second side of the at least one lower sieve and the at least one upper sieve, wherein the unshelled hazelnut purified from the foreign substances is discharged through the at least one first goods outlet.

4. The pre-cleaning system according to claim 1, wherein the at least one flow path in the at least one second separation unit comprises at least one first blowing part and at least one first suction part, wherein the at least one first blowing part forms an air pressure from a first side, and the at least one first suction part is configured to realize an air suction on a second side.

5. The pre-cleaning system according to claim 4, wherein at least one second waste discharge part is provided for providing a discharge of the foreign substances at the at least one first blowing part, and at least one second goods outlet part is provided to enable a discharge of a cleaned unshelled hazelnut at the at least one first suction part.

6. The pre-cleaning system according to claim 4, wherein at least one wall is provided to at least partially displace in the at least one second separation unit and the at least one wall is configured to arrange an air flow speed in the at least one flow path and the at least one wall is configured to arrange a separation process thanks to that the air flow speed in the at least one flow path is arranged.

7. The pre-cleaning system according to claim 1, wherein at least one inverse stepped sieve is provided on the at least one third separation unit in an at least partially inclined form with respect to the floor, wherein the unshelled hazelnut is laid and positioned on the at least one inverse stepped sieve, at least one second blowing part and at least one second suction part are provided on the at least one third separation unit, wherein the at least one second blowing part and the at least one second suction part are configured to realize the air flow for providing a separation of the unshelled hazelnut and the foreign substances from each other on the at least one inverse stepped sieve, and the at least one inverse stepped sieve is at least partially movable in order to be able to carry foreign substances, wherein the foreign substances exist on the at least one inverse stepped sieve.

* * * * *